US011096429B2

(12) United States Patent
Riehl

(10) Patent No.: US 11,096,429 B2
(45) Date of Patent: Aug. 24, 2021

(54) SYSTEM AND METHOD FOR WIRELESS CHARGING OF SMART GARMENTS

(71) Applicant: Analog Devices, Inc., Norwood, MA (US)

(72) Inventor: Patrick Stanley Riehl, Lynnfield, MA (US)

(73) Assignee: Analog Devices, Inc., Wilmington, MA (US)

( * ) Notice: Subject to any disclaimer, the term of this patent is extended or adjusted under 35 U.S.C. 154(b) by 304 days.

(21) Appl. No.: 16/005,579

(22) Filed: Jun. 11, 2018

(65) Prior Publication Data

US 2018/0352875 A1 Dec. 13, 2018

Related U.S. Application Data

(60) Provisional application No. 62/519,099, filed on Jun. 13, 2017.

(51) Int. Cl.
*H02J 50/10* (2016.01)
*H02J 7/02* (2016.01)
(Continued)

(52) U.S. Cl.
CPC ............ *A41D 1/005* (2013.01); *H01F 27/40* (2013.01); *H01F 38/14* (2013.01); *H02J 7/025* (2013.01);
(Continued)

(58) Field of Classification Search
CPC . H02J 50/10; H02J 50/40; H02J 7/025; A41D 1/005; A41D 1/00; H01F 38/14; H01F 2027/408
(Continued)

(56) References Cited

U.S. PATENT DOCUMENTS 6,210,771 B1 * 4/2001 Post .................. H05K 1/038
428/100
7,076,206 B2 7/2006 Elferich et al.
(Continued)

FOREIGN PATENT DOCUMENTS

DE 40 04 682 A1 8/1991
GB 201216394 10/2012
(Continued)

OTHER PUBLICATIONS

Usman et al., Flexible & Planar Implantable Resonant Coils for Wireless Power Transfer Using Inkjet Masking Technique. School of Electrical and Computer Engineering, Georgia Institute of Technology. Conference Paper. Jan. 2016; 4 pages.
(Continued)

*Primary Examiner* — Hal Kaplan
*Assistant Examiner* — Swarna N Chowdhuri
(74) *Attorney, Agent, or Firm* — Wolf, Greenfield & Sacks, P.C.

(57) ABSTRACT

Techniques for wirelessly charging smart textiles, such as smart garments, are provided. Aspects of the present application provide a smart garment device with an array of integrated coils and rectifiers that enable wireless charging of the device from a drawer or other enclosure that produces a roughly uniform AC magnetic field. The smart garment can draw power from the magnetic field once placed within the enclosure, regardless of how the garment is placed in the enclosure. The method can be applied to garments of any shape, and multiple garments can be charged simultaneously by placing the multiple garments into the same magnetic field.

20 Claims, 9 Drawing Sheets

(51) Int. Cl.

| | | |
|---|---|---|
| *H01F 38/14* | (2006.01) | |
| *A41D 1/00* | (2018.01) | |
| *H02J 50/40* | (2016.01) | |
| *H01F 27/40* | (2006.01) | |
| *A47B 61/00* | (2006.01) | |
| *A47C 7/72* | (2006.01) | |
| *A47B 88/919* | (2017.01) | |

(52) U.S. Cl.
CPC .............. *H02J 50/10* (2016.02); *H02J 50/40* (2016.02); *A41D 2500/10* (2013.01); *A41D 2500/20* (2013.01); *A47B 61/003* (2013.01); *A47B 88/919* (2017.01); *A47C 7/72* (2013.01); *H01F 2027/408* (2013.01)

(58) Field of Classification Search
USPC .................................................... 307/104, 31
See application file for complete search history.

(56) References Cited

U.S. PATENT DOCUMENTS

| | | | |
|---|---|---|---|
| 7,084,826 B2 | 8/2006 | Aisenbrey | |
| 7,408,324 B2 | 8/2008 | Baarman et al. | |
| 7,414,380 B2 | 8/2008 | Tang et al. | |
| 7,863,859 B2* | 1/2011 | Soar | H02J 7/025 320/108 |
| 8,169,185 B2 | 5/2012 | Partovi et al. | |
| 9,112,363 B2 | 8/2015 | Partovi | |
| 9,530,555 B2 | 12/2016 | Teggatz et al. | |
| 2002/0154518 A1* | 10/2002 | Elferich | H02J 50/12 363/15 |
| 2006/0061325 A1 | 3/2006 | Tang et al. | |
| 2006/0087282 A1* | 4/2006 | Baarman | H02J 50/10 320/108 |
| 2007/0020445 A1* | 1/2007 | Liu | D03D 9/00 428/195.1 |
| 2007/0182367 A1* | 8/2007 | Partovi | H02J 7/00 320/108 |
| 2008/0067874 A1* | 3/2008 | Tseng | A61C 17/224 307/104 |
| 2009/0218884 A1* | 9/2009 | Soar | H02J 50/10 307/11 |
| 2009/0284164 A1* | 11/2009 | Ray | A47F 3/001 315/218 |
| 2012/0007439 A1* | 1/2012 | Kozakai | H02J 50/70 307/104 |
| 2012/0043887 A1* | 2/2012 | Mesibov | H02J 50/12 315/76 |
| 2012/0228954 A1 | 9/2012 | Kesler et al. | |
| 2013/0119928 A1 | 5/2013 | Partovi | |
| 2013/0285606 A1 | 10/2013 | Ben-Shalom et al. | |
| 2014/0008992 A1* | 1/2014 | Leabman | A43B 17/003 307/104 |
| 2014/0028111 A1 | 1/2014 | Hansen et al. | |
| 2014/0131341 A1* | 5/2014 | Rothschild | H05B 1/0227 219/209 |
| 2015/0069847 A1* | 3/2015 | Meyer | H02J 7/025 307/104 |
| 2015/0162751 A1* | 6/2015 | Leabman | H04W 4/80 219/211 |
| 2016/0072297 A1* | 3/2016 | Fine | H02J 50/12 307/104 |
| 2016/0111208 A1* | 4/2016 | Park | H01F 27/006 307/104 |
| 2016/0172869 A1* | 6/2016 | Park | H02J 50/40 307/104 |
| 2016/0189848 A1* | 6/2016 | Nam | H01F 38/14 307/104 |
| 2017/0093172 A1 | 3/2017 | Von Novak, III et al. | |
| 2017/0179750 A1* | 6/2017 | Oo | H04B 5/0081 |
| 2017/0179771 A1* | 6/2017 | Leabman | H02J 50/15 |
| 2018/0123246 A1* | 5/2018 | Wu | H04B 5/0081 |
| 2018/0262055 A1* | 9/2018 | Schoenbart | H01F 38/14 |
| 2018/0323635 A1* | 11/2018 | Fetters | A47G 25/00 |
| 2019/0138068 A1* | 5/2019 | Park | G06F 1/163 |
| 2020/0021126 A1* | 1/2020 | Seo | H02J 50/10 |

FOREIGN PATENT DOCUMENTS

| | | |
|---|---|---|
| GB | 2491525 B | 4/2013 |
| WO | WO 2015/088875 A1 | 6/2015 |

OTHER PUBLICATIONS

Zhu et al., Inductive Power Transfer in E-Textile Applications: Reducing the Effects of Coil Misalignment. Electronics and Computer Science. University of Southampton, Southampton, UK. May 2015; 4 pages.

* cited by examiner

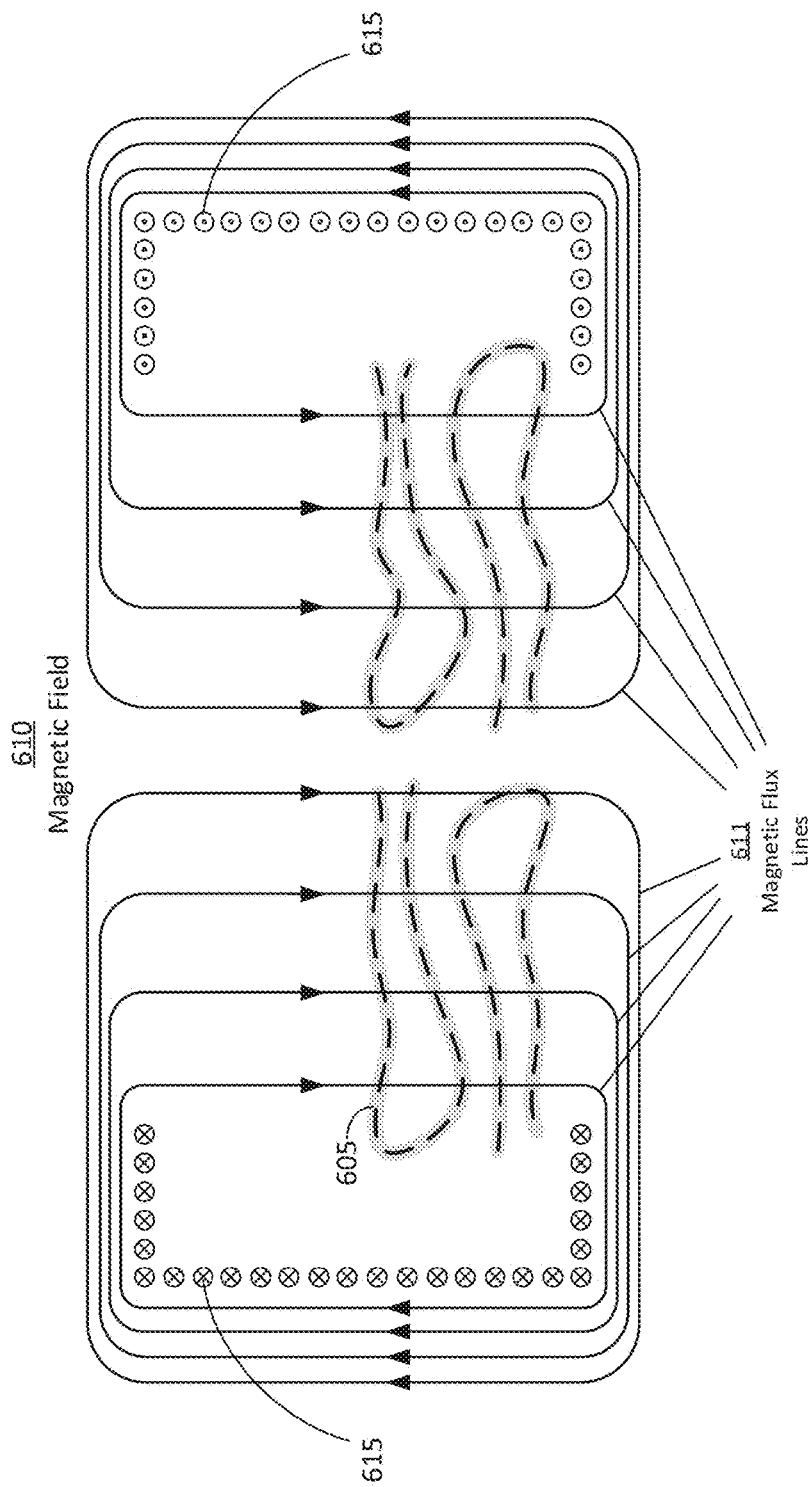

SYSTEM AND METHOD FOR WIRELESS CHARGING OF SMART GARMENTS

CROSS-REFERENCES TO RELATED APPLICATIONS

The present application claims the benefit under 35 U.S.C. § 119(e) of U.S. Provisional Patent Application No. 62/519,099, filed Jun. 13, 2017, titled "System And Method For Wireless Charging Of Smart Garments," which is hereby incorporated by reference in its entirety.

FIELD OF THE DISCLOSURE

The present application relates to techniques for wireless charging of smart textiles, such as smart garments.

BACKGROUND

Smart clothing is an emerging market with tremendous growth potential. Among the proposed functions that could be integrated into clothing are vital sign monitoring, user interfaces, active heating and cooling, active comfort control, active displays, gesture recognition, posture monitoring and/or hazardous condition monitoring. Such functions generally require a power source, however.

Harvesting energy from motion or other aspects of the wearer is sometimes proposed as a technique to power smart garments, but the available energy created in this manner is generally quite limited on clothing (e.g., less than 1 mW) and may be insufficient for many desired functions of the garment. Batteries that can provide sufficient energy for desired functions may be too heavy and/or too bulky to be acceptable in garments.

SUMMARY OF THE DISCLOSURE

Techniques for wirelessly charging smart textiles, such as smart garments, are provided. Aspects of the present application provide a smart garment device with an array of integrated coils and rectifiers that enable wireless charging of the device from a drawer or other enclosure that produces a roughly uniform AC magnetic field. The smart garment can draw power from the magnetic field once placed within the enclosure, regardless of how the garment is placed in the enclosure. The method can be applied to garments of any shape, and multiple garments can be charged simultaneously by placing the multiple garments into the same magnetic field.

According to some aspects, a wirelessly chargeable smart garment is provided comprising at least one textile, and a wireless power receiver integrated into the at least one textile, the wireless power receiver comprising a plurality of inductors, and a plurality of rectifying elements in series with respective inductors of the plurality of inductors.

According to some aspects, a system for wirelessly charging smart garments is provided, the system comprising an enclosure comprising at least one magnetic field source operable to produce an AC magnetic field within the enclosure, and a garment within the enclosure, the garment comprising at least one textile, and a wireless power receiver integrated into the at least one textile, the wireless power receiver comprising a plurality of inductors, and a plurality of rectifying elements in series with respective inductors of the plurality of inductors.

According to some aspects, a wirelessly chargeable smart garment is provided comprising at least one textile, and a wireless power receiver integrated into the at least one textile, the wireless power receiver comprising a plurality of interconnected unit cells, each unit cell of the plurality of unit cells comprising at least one inductor and at least one rectifying element.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 6 depicts a cross-sectional view of smart garments situated within a magnetic field generated by a coil, according to some embodiments;

DETAILED DESCRIPTION

Figure 1:
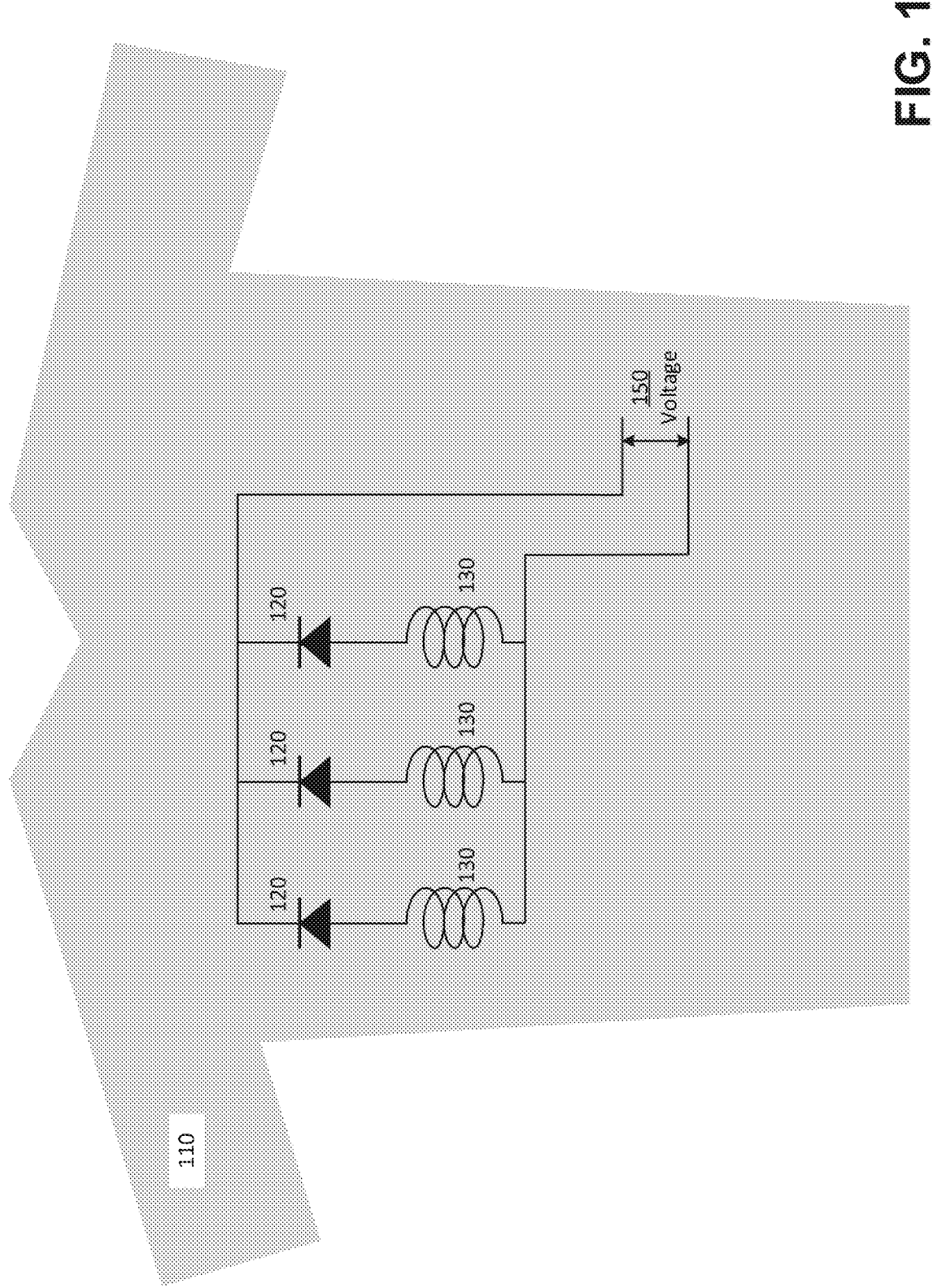
FIG. 1 depicts an illustrative smart garment comprising a wireless charging circuit, according to some embodiments.

As an alternative to the above-described uses of energy harvesting and batteries as power sources for smart garments, periodic charging of a smart garment is an alternative lacking the limitations of the prior-described techniques. Still, the inventor has appreciated that approaches for charging garments via periodic wired or wireless charging can suffer from several shortcomings.

With respect to wired charging, a wired connector may expose conductors that compromise the ability of the garment to withstand moisture during wear and washing. In addition, the user of the garment must manually connect the wired charger, making the overall maintenance of the garment more complicated and less convenient. With respect to wireless charging, the inventor has recognized that some potential constructions of wireless charging arrangement will require proper alignment of charging components within the garment with a source of wireless power. For instance, some wireless charging systems might include mounting structures onto or into which the garment must be installed and arranged correctly to effectuate a transfer of power to the garment (e.g., a charging hanger). The inventor has recognized, however, that such an approach therefore would complicate the overall maintenance of the garment.

The inventor has recognized techniques for wireless charging of a smart garment that do not compromise waterproofing or require any additional day-to-day effort on the part of the user. In particular, the inventor has recognized wireless charging techniques that do not require the user to align the garment to the charger. Aspects of the present application provide a smart garment device with an array of integrated coils and rectifiers that enable wireless charging of the device from a drawer or other enclosure that produces a roughly uniform AC magnetic field. The smart garment can draw power from the magnetic field once placed within the enclosure, regardless of how the garment is placed in the enclosure. In some embodiments, this result may be achieved via interconnected unit cells, all, or at least some of which, include an inductor and a rectifier, so that at least some of the inductors from amongst the unit cells will generate current from the AC magnetic field irrespective of the orientation of various parts of the garment. The method of drawing power can be applied to garments of any shape, and multiple garments can be charged simultaneously by placing the multiple garments into the same magnetic field.

When inductors are arranged in arbitrary positions and directions within a time-varying (AC) magnetic field, the inductors would be expected to generate current in a variety of different ways. In particular, some of the inductors may couple in-phase to the magnetic field, some may couple in anti-phase, and some may not couple at all. As a result, the net DC power of the inductors may be unpredictable and may not represent a net positive power.

In contrast, according to some embodiments of the present disclosure, a smart garment may include one or more inductors that are each arranged in series with one or more rectifiers (e.g., one or more diodes). When inductors are each arranged in series with one or more rectifiers, the rectifiers each produce a DC current from the AC current generated by the inductor. Then, when the DC currents output by the rectifiers are combined, the power received is combined in an additive fashion and a net DC power is produced. Thus, even when the inductors are arranged in arbitrary positions and directions within an AC magnetic field, a net DC power may be produced. In some embodiments, a net DC power may be produced from inductors in a non-series arrangement with one or more rectifiers. For instance, an inductor may be connected to a full bridge rectifier (e.g., at opposing connections of the bridge) so that a net DC current is output from the bridge.

According to some embodiments, a magnetic field for charging a smart garment may be produced within an enclosure, such as a piece of furniture (e.g., a drawer) or built into part of a clothing storage area, such as a closet. Irrespective of the particular enclosure, the magnetic field may be generated by one or more coils that wrap around part of the structure of the enclosure, thereby producing the magnetic field in the interior of the enclosure. When a smart garment comprising one or more inductors is placed within the enclosure, power may be transferred to the smart garment by the magnetic field inducing a current in the inductors. As discussed above, a net DC power may be produced in the smart garment by arranging a rectifier in series with each of the inductors are always effectively transferred to the smart garment irrespective of the orientation of each of the inductors.

It may be noted that, in some embodiments, use of a rectifier in this manner may sacrifice a substantial fraction of the total available power (e.g., around half) to ensure that net DC power is produced to obtain the benefit of allowing arbitrary orientations of the garment. To the extent that this reduction in power is undesirable, however, additional inductors may be added to the garment to increase the amount of power generated within the garment. In some embodiments, however, such a reduction in available power may not occur—for instance, in some embodiments in which the rectifier is a full-bridge rectifier.

While the techniques described herein are primarily discussed in relation to garments, it will be appreciated that the techniques may be applied with respect to any textile, not just those that may be worn. For instance, upholstery (e.g., as part of furniture, within a vehicle, etc.) may incorporate smart electronics and a battery that may be charged via the techniques described herein.

According to some embodiments, inductors and rectifiers within a smart garment may be arranged into a repeating pattern or array. Forming a circuit within a textile by electrically connecting "unit cells" in parallel that each contain the same arrangement of inductors and rectifiers may have several advantages. First, the resulting circuit has redundancy in the event that one of the unit cells is damaged or otherwise fails to contribute power through induction. Although a portion of the circuit may contain a damaged inductor and a portion of an open circuit, this may not negatively affect the performance of the remainder of the circuit. This feature also enables the textile to be cut and handled in a traditional manner. For instance, a roll of fabric may be produced that incorporates the circuit array throughout. This fabric may be cut and assembled into a garment in the traditional way, since cutting through a unit cell of the circuit array will not negatively affect the performance of the circuit portions that remain in the garment.

As used herein, the term "smart garment" refers to an article of clothing that incorporates one or more active electronic components, which draw power to operate. Such components may, for example, be configured for electronic sensing, computation, communications and/or actuation. A smart garment may additionally incorporate any number of passive electrical components, such as wires, resistors, capacitors, inductors, transformers, and/or diodes, etc.

Following below are more detailed descriptions of various concepts related to, and embodiments of, techniques for wireless charging of smart garments. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts an illustrative smart garment comprising a wireless charging circuit, according to some embodiments. Smart garment 100 includes a textile 110 and a wireless charging circuit embedded within (or otherwise attached to) the textile that includes rectifiers (which may also be referred to as rectifying elements) 120 and inductors 130. Although three rectifiers and inductors are shown in the example of FIG. 1, it will be appreciated that in general any number of inductors serially coupled to respective rectifiers may be included in smart garment 100.

In the example of FIG. 1, the rectifiers 120 are connected serially to respective inductors 130, and the inductor-rectifier pairs are connected to one another in parallel. A net voltage 150 may be produced across this circuit when the smart garment 100 is placed within an AC magnetic field. The voltage 150 may be coupled to a battery and/or to other components of the smart garment 100.

The inductors 130 may be fabricated using any suitable method. For example, the inductors may be comprised of conductive fibers woven or knitted into the textile. Alternatively, the inductors may be fabricated using a planar or three-dimensional printing process and later integrated into the textile, or simply wound from electrical wire. According to some embodiments, the inductors 130 may include spiral conductive coils.

While in the example of FIG. 1 the rectifiers 120 are depicted as diodes, in general such rectifiers (or "rectifying elements") may include other examples of voltage rectifiers, such as half-bridge rectifiers and/or full-bridge rectifiers, both passive and/or synchronous. Irrespective of the type of rectifier(s) included in smart garment 100, the rectifiers 120 may be, according to some embodiments, realized as fiber-based devices fully integrated into the textile, and/or realized as discrete solid-state devices attached to the textile.

According to some embodiments, rectifiers 120 may include one or more light-emitting diodes (LEDs). This approach may allow the garment to light up while simultaneously being charged, for instance to indicate charging is taking place and/or for aesthetic purposes. In some cases, the one or more LEDs may also be illuminated during wear for aesthetic effect.

According to some embodiments, rectifiers 120 may include one or more photovoltaic cells. During charging, a photovoltaic cell may function as a diode, whereas during wearing of the smart garment 100, the cell could generate power from solar energy.

Figure 2:
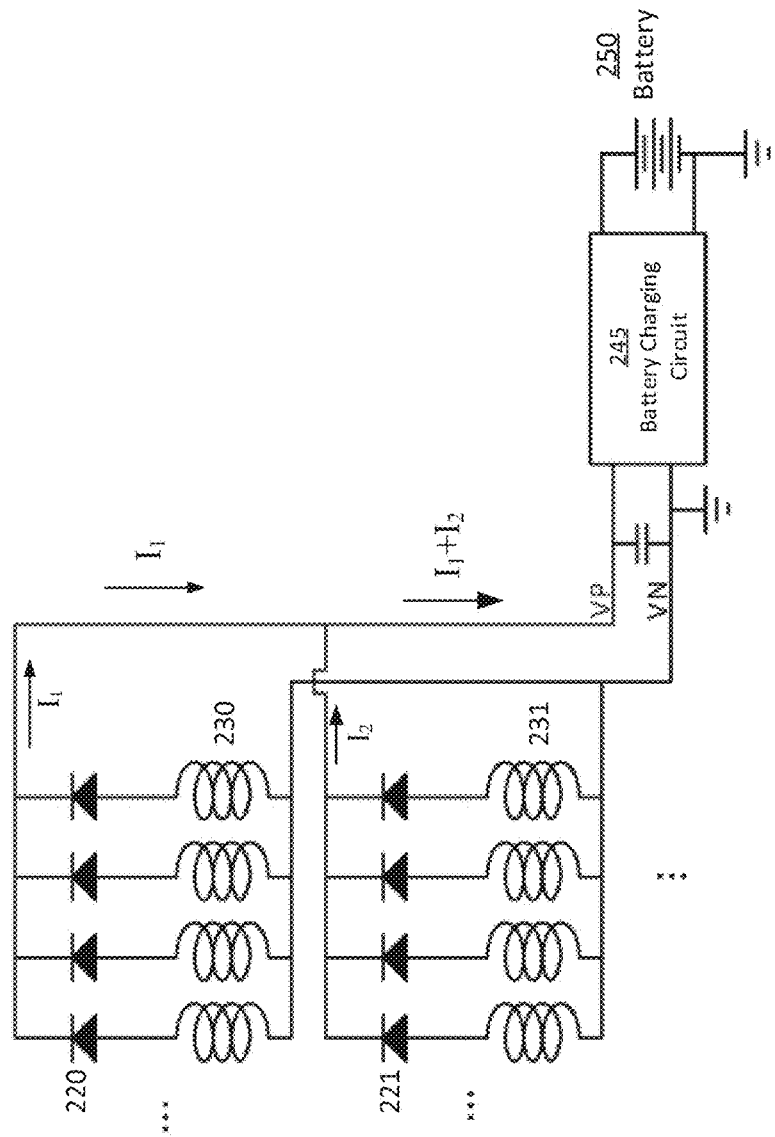
FIG. 2 depicts an illustrative wireless charging circuit in which groups of inductors and rectifiers are connected in parallel, according to some embodiments.

In general, any number of inductors 130 and rectifiers 120 may be connected together within one or more circuits of the smart garment 100. As discussed above, connecting rectifiers in serial with respective inductors ensures that no matter the relative orientation of the inductors with respect to a magnetic field, a net positive DC current is produced. Groups of inductors 130 and rectifiers 120 may be arranged in numerous arrangements, including by arranging groups of inductors and rectifiers in parallel with one another, such as is shown by the example of FIG. 2. In addition, any number of other components, including any number of batteries, may be connected to any number of wireless charging circuits.

The example of FIG. 2 depicts a wireless charging circuit 200 in which a first subcircuit comprising rectifiers 220 each connected serially to respective inductors 230, a second subcircuit comprising rectifiers 221 each connected serially to respective inductors 231, wherein the first and second subcircuits are connected to one another in parallel. In the example of FIG. 2, a net DC voltage V(VP,VN) produced by the inductors 230 and 231, and rectified by the rectifiers 220 and 221, charges battery 250 via the battery charging circuit 245.

In the example of FIG. 2, current produced from the inductors 230 is shown as current $I_1$, and current produced from the inductors 231 is shown as current $I_2$. These currents combine to supply a net current $I_1+I_2$ to the battery charging circuit 245 along the line labeled "VP."

Figure 3:
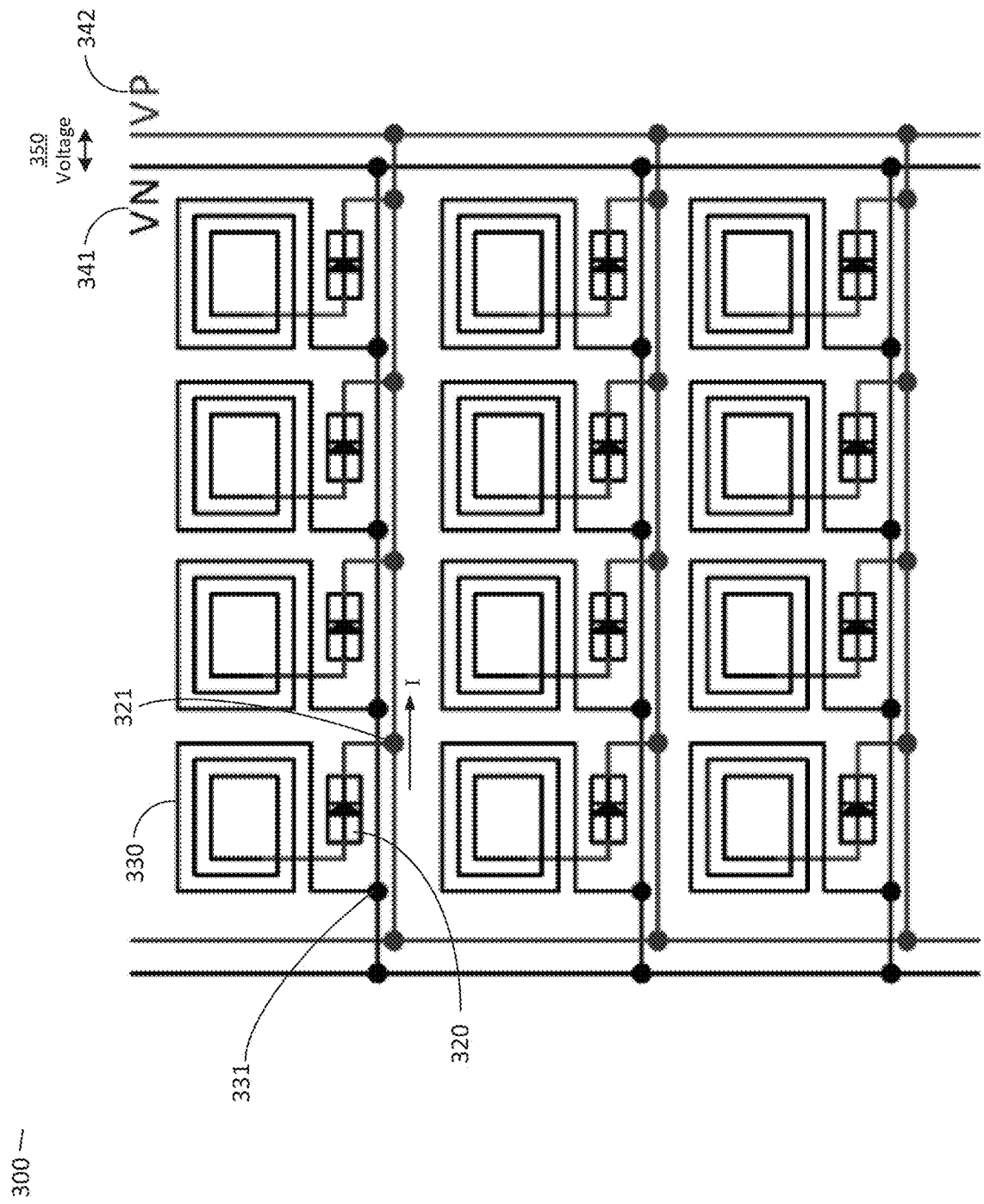
FIG. 3 depicts an array of inductors and rectifiers in a wireless charging circuit, according to some embodiments.

FIG. 3 depicts an array of inductors and rectifiers in a wireless charging circuit, according to some embodiments. In the example of FIG. 3, wireless charging circuit 300 includes twelve spiral coil inductors, of which inductor 330 is one example, each connected in serial to a respective rectifier, of which rectifier 320 is one example. Each inductor in a row of four inductors is connected to the other inductors in parallel, and each row of inductors is connected to the other rows of inductors in parallel. Inductors and rectifiers in FIG. 3 are connected to the voltage lines 341 (VN) and 342 (VP) via respective nodes; for instance, inductor 330 is connected to voltage line 341 via node 331, and rectifier 320 is connected to voltage line 342 via node 321. As a result of current being produced by the inductors and rectified, a net DC voltage 350 is produced by the inductors.

In the example of FIG. 3, the wireless charging circuit 300 has sufficient redundancy that if one or more of the inductors ceased to carry or produce a current, the wireless charging circuit as a whole would continue to function (albeit with a potentially reduced voltage output). As discussed above, this allows a textile comprising a wireless charging circuit such as circuit 300 to be handled in a conventional manner.

Figure 4:
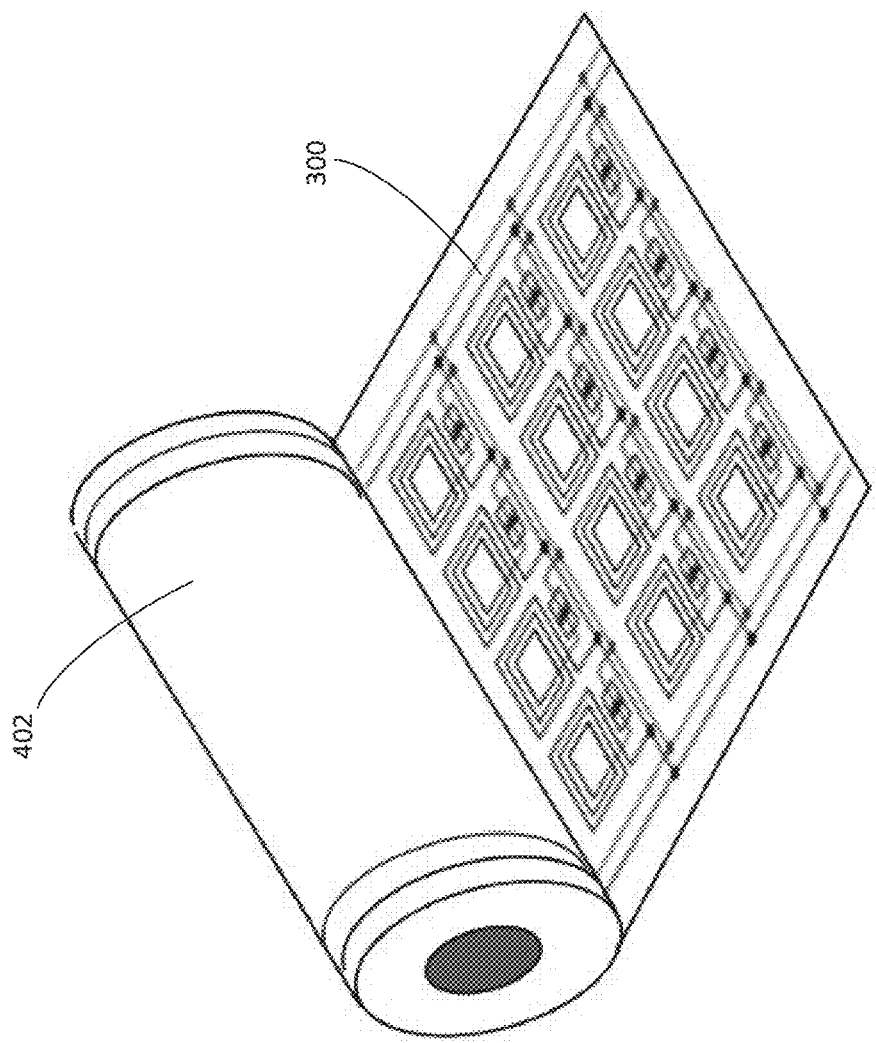
FIG. 4 illustrates a roll of fabric that contains a wireless charging circuit, according to some embodiments.

As one example, FIG. 4 illustrates a roll of fabric 400 that contains a wireless charging circuit, according to some embodiments. In the example of FIG. 4, wireless charging circuit 300 shown in FIG. 3 is incorporated into fabric 402. This fabric could, for instance, be rolled out and cut and handled in a manner conventional for producing garments or other textile-based items. It will be appreciated that fabric 400 may be utilized in numerous implementations that are not limited to charging by placing the fabric within an enclosure containing a magnetic field. For instance, fabric 400 may form part of a piece of furniture, such as a chair, and be charged via a technique other than the enclosure-based approach described below in relation to FIGS. 7A-7B.

Figure 5:
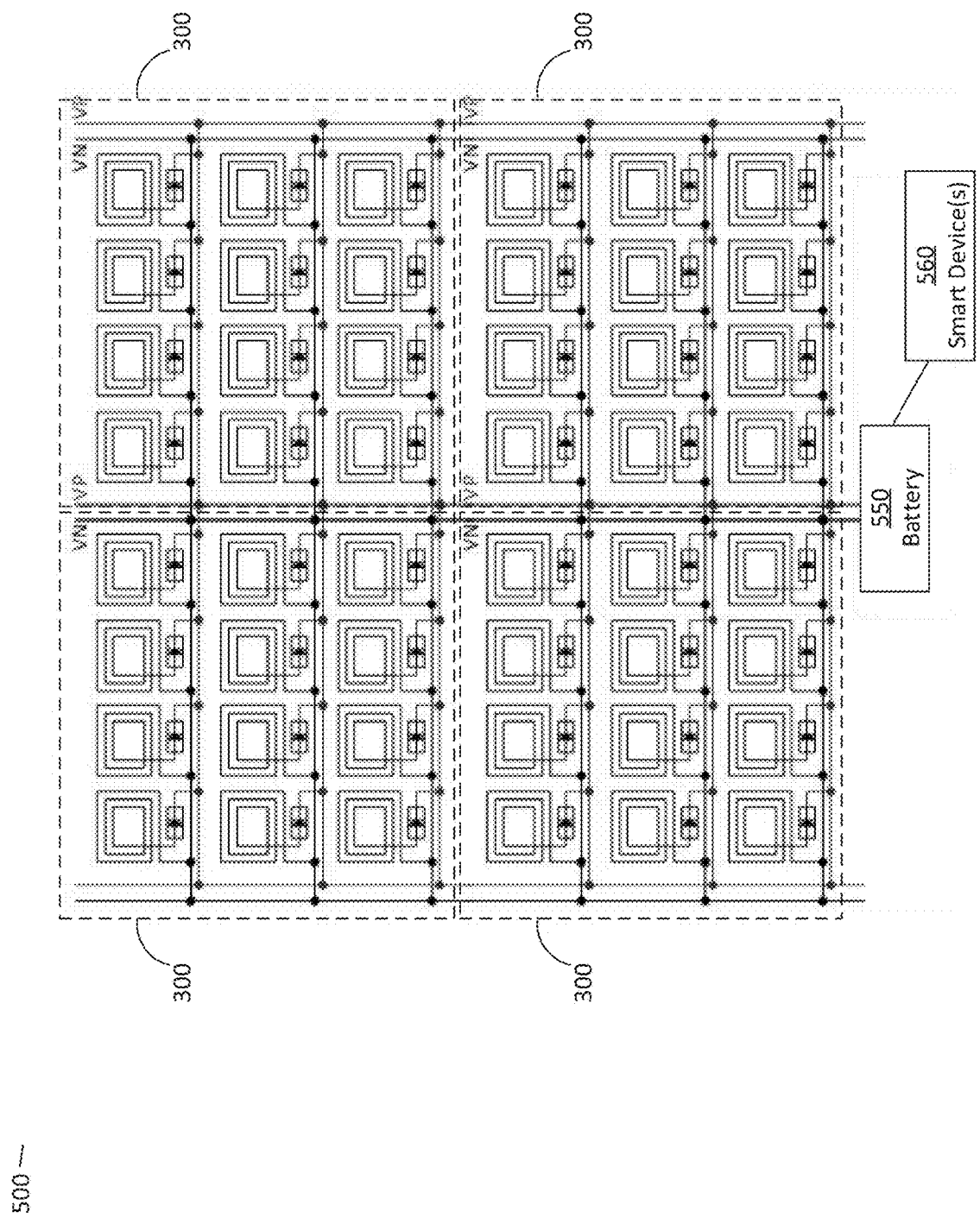
FIG. 5 depicts an array of unit cells of a wireless charging circuit, according to some embodiments.

FIG. 5 depicts an array of unit cells of a wireless charging circuit, according to some embodiments. To illustrate an additional example of inductors and rectifiers arranged in repeating units, wireless charging circuit 500 includes four instances of wireless charging circuit 300 shown in FIG. 3 connected together in an array. Multiple voltage lines VN and VP are present within wireless charging circuit 500, which further allows the fabric to be cut in an arbitrary way without significantly inhibiting the circuit from generating a DC voltage that can be connected to battery 550. For example, if any of the four instances of wireless charging circuit 300 were cut in half in the example of FIG. 5 and the circuit placed in an AC magnetic field, the remaining three instances of wireless charging circuit 300 would continue to supply a voltage to battery 550 (and in some cases a portion of the cut instance of wireless charging circuit 300 may do so as well). Although not shown in FIG. 5 for clarity, current may flow from each of the rectifiers along the lines labeled VP to the battery 550.

In the example of FIG. 5, the battery 550 is connected to one or more smart devices 560. These devices may perform functions such as sensing, communications, computation and/or actuation within a garment in which wireless charging circuit 500 is provided. Such devices may include one or more sensors, processors, wireless devices (e.g., radio transmitter and/or receiver), actuators, computer readable media, or combinations thereof. In some embodiments, smart device(s) 560 may include one or more processors coupled to one or more computer readable media, the media storing instructions that, when executed by the one or more processors, perform a function within a garment in which wireless charging circuit 500 is provided.

For example, a garment configured to detect and provide feedback on bodily posture may include wireless charging circuit 500. In this example embodiment, the smart devices 560 may include a plurality of sensors to detect posture of a wearer of the garment coupled to one or more processors coupled to the sensors and arranged to receive signals from the sensors. The one or more processors may evaluate posture based on the received signals and produce a visual and/or audible indication of the quality of the posture based on said signals (e.g., via one or more LEDs or other lights of the smart garment). In such an embodiment, it will be appreciated that the one or more processors may execute these acts via hardware, software (e.g., by executing instructions stored on one or more computer readable media), or a combination of both.

FIG. 6 depicts a cross-sectional view of smart garments situated within a magnetic field generated by a coil, according to some embodiments. In the example of FIG. 6, smart garments 605 are placed within a magnetic field 610. Smart garments 605 are shown in cross-section in the figure and represent folded items of clothing, such as a folded shirt, in cross-section. As illustrated, the smart garments 605 include a textile (shown in light gray) and a plurality of inductors (shown as black lines within the textile).

Magnetic field 610 may be produced by coil 615, shown in cross section protruding into and out of the plane of the drawing. According to some embodiments, coil 615 may produce a uniform, or substantially uniform, AC magnetic field. The magnetic field 610 is represented in the example of FIG. 6 by magnetic flux lines 611 which connect locations with equal magnetic flux.

According to some embodiments, the coil 615 may be incorporated into a housing or other enclosure surrounding at least part of the smart garments 605. For instance, the coil 615 may be incorporated into a washing machine or clothes dryer such that a magnetic field is generated within its interior, thereby allowing the wireless charging of smart garments placed within the machine or dryer. In some embodiments, the coil 615 may be integrated into a piece of furniture such as a chest of drawers, or built in to a clothes storage area.

According to some embodiments in which the coil 615 is incorporated into an enclosure, a back iron may be formed by encapsulating the enclosure with high-permeability material so as to contain most of the return flux inside the drawer housing. As such, the volume surrounding the enclosure can be largely free from electromagnetic interference. Examples of such high-permeability material may include ferrite and iron.

According to some embodiments in which the coil 615 is incorporated into an enclosure, the enclosure may comprise a mechanism that activates and deactivates wireless charging within by activating and deactivating current flowing through the coil 615. In some embodiments, such a mechanism may be a power button or other such device that a user may interact with to enable or disable charging. In some embodiments, such a mechanism may include an interlock mechanism that activates when the enclosure is closed (e.g., when a door or other feature a user may access to supply smart garments to the interior of the enclosure is closed). This approach may ensure that electromagnetic interference is contained. In some embodiments, charging may be activated or deactivated at certain times of day or night.

Figure 7A:
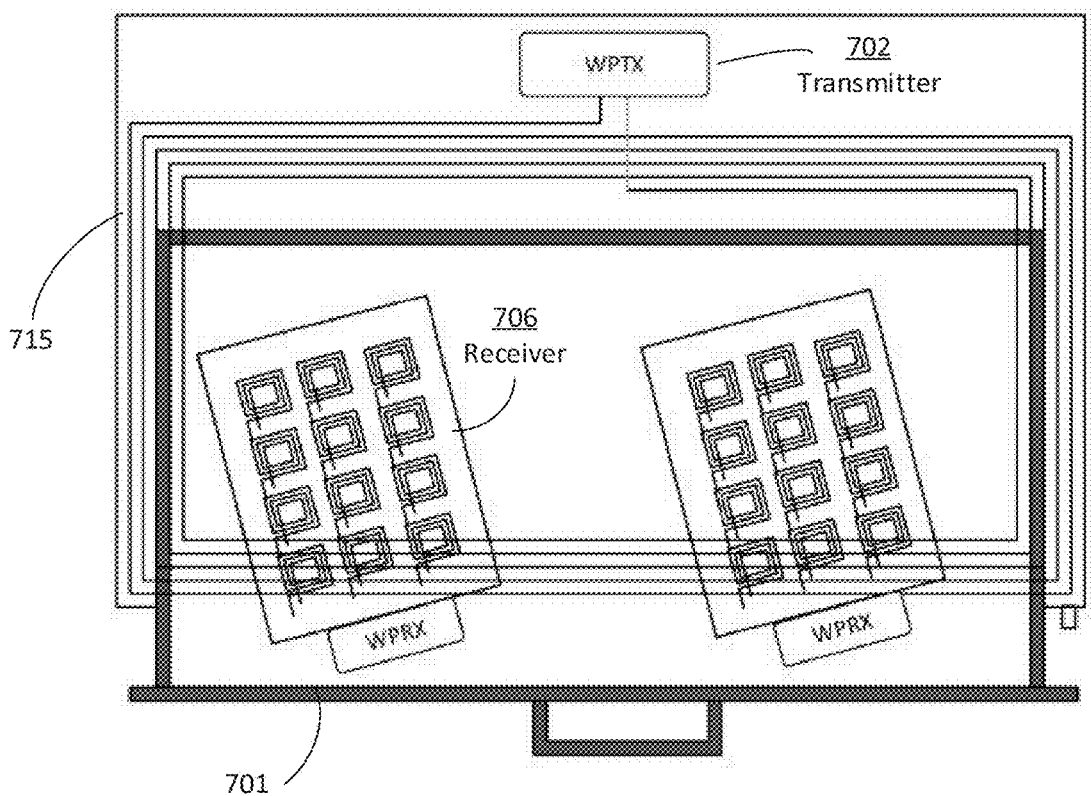
FIGS. 7A and 7B and top and front views, respectively, of a drawer enclosure configured to produce a magnetic field to wirelessly charge smart garments, according to some embodiments.
Figure 7B:
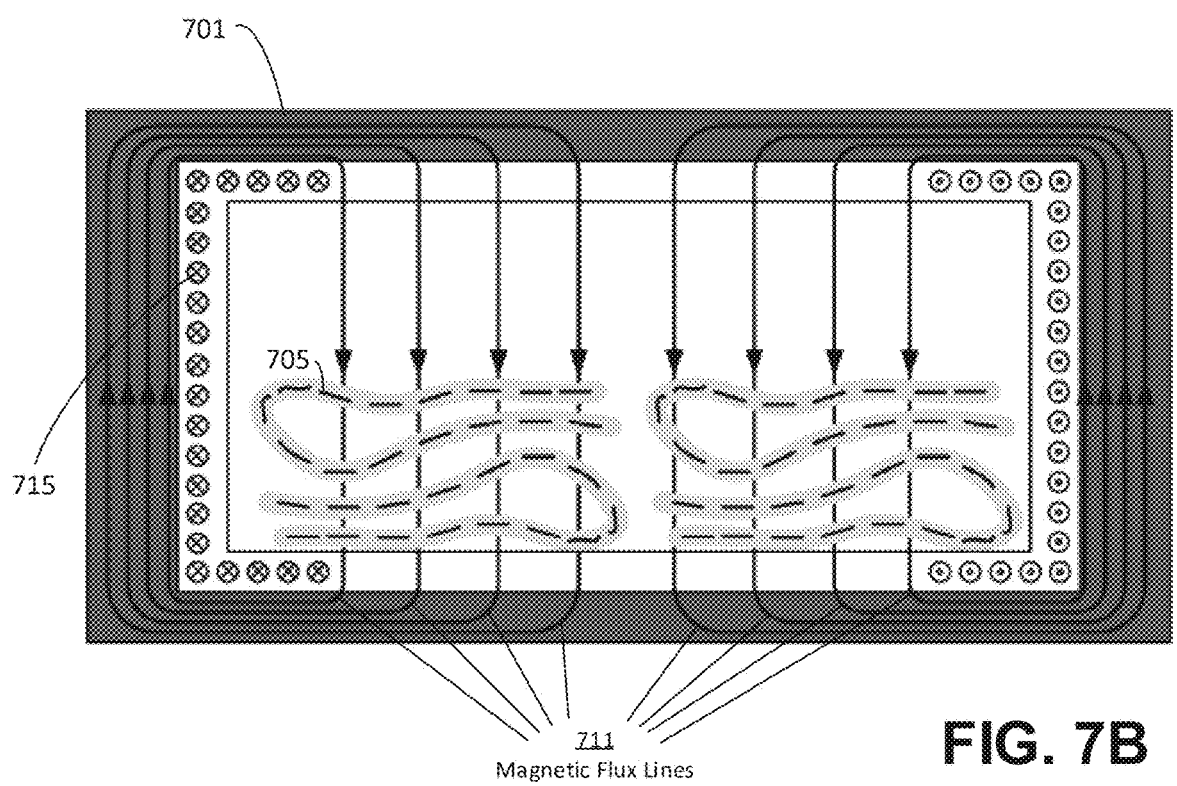

FIGS. 7A and 7B and top and front views, respectively, of a drawer enclosure configured to produce a magnetic field to wirelessly charge smart garments, according to some embodiments. In the example of FIGS. 7A-7B, a drawer 701 holds smart garments 705 in which a wireless charging circuit 706 is disposed. Smart garments 705 are shown in cross-section in the figure and represent folded items of clothing, such as a folded shirt, in cross-section. As illustrated, the smart garments 705 include a textile (shown in light gray) and a plurality of inductors (shown as black lines within the textile).

The interior of the unit (e.g., dresser) into which the drawer may be inserted contains a coil 715 coupled to a power transmitter 702. The magnetic field 710 is represented in the example of FIG. 7 by magnetic flux lines 711 which connect locations with equal magnetic flux.

As a result of the techniques described herein, the smart garments 705 may be placed in any position and orientation within the drawer 701 yet, when the coil 715 is operated to produce an AC field and the drawer is inserted, a DC voltage will be produced in the wireless charging circuit 706. For example, the smart garment could even be crumpled up and thrown into the drawer and still a DC voltage will be produced. As a result, the impact to the overall maintenance of the garment as a result of charging procedures is minimal, or even non-existent.

Figure 8:
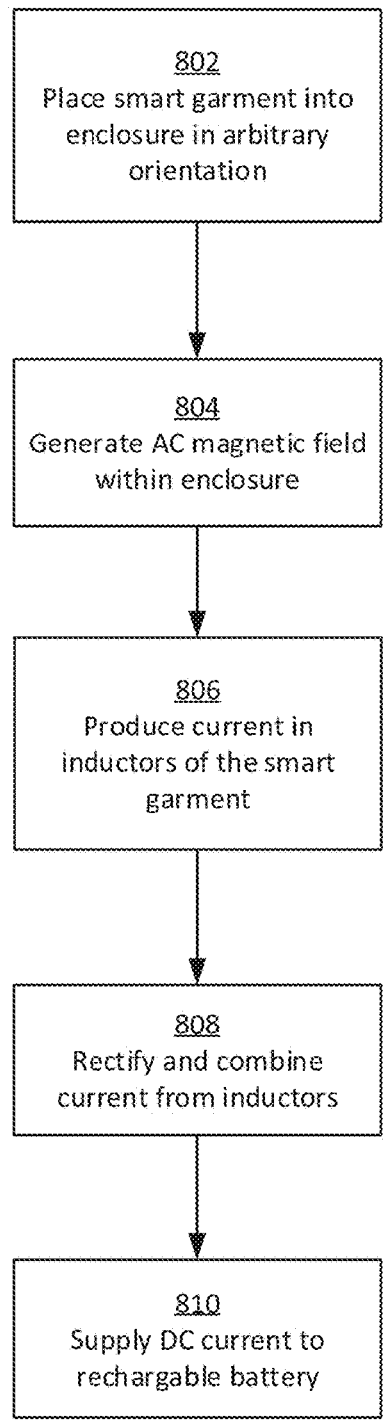
FIG. 8 is a flowchart of a method of wirelessly charging a garment, according to some embodiments.

FIG. 8 is a flowchart of a method of wirelessly charging a garment, according to some embodiments. Method 800 begins in act 802 in which a smart garment is placed into an enclosure. The smart garment may, for instance, include any smart garments discussed herein, including smart garment 100 shown in FIG. 1. The enclosure may include any space that at least partially surrounds the garment, and need not completely encase the garment. For example, the enclosure may include a drawer, a box, a closet, a shelf, a laundry machine, a bag, etc. As discussed above, a smart garment including a wireless charging circuit as described herein may be placed into the enclosure in any orientation for charging.

In act 804, an AC magnetic field is generated within the enclosure. The magnetic field may, or may not, occupy the entire volume of the enclosure so long as at least part of the garment is situated within the magnetic field. In addition, it will be appreciated that act 804 may occur before, simultaneously with, or after act 802 since, to charge the smart garment, it is, according to some non-limiting embodiments, only necessary that the magnetic field be activated within the enclosure at the same time that a smart garment is placed within the field.

In act 806, current is produced within one or more wireless charging circuits of the smart garment as a result of the AC magnetic field producing an AC current within inductors of the circuit(s). In act 808, the AC current so produced is rectified by one or more rectifiers (e.g., diodes) connected serially with respective inductors, thereby producing a DC current. In act 810, DC current from a plurality of the inductors in the smart garment is supplied to a rechargeable battery of the smart garment, thereby charging the battery.

Figure 9:
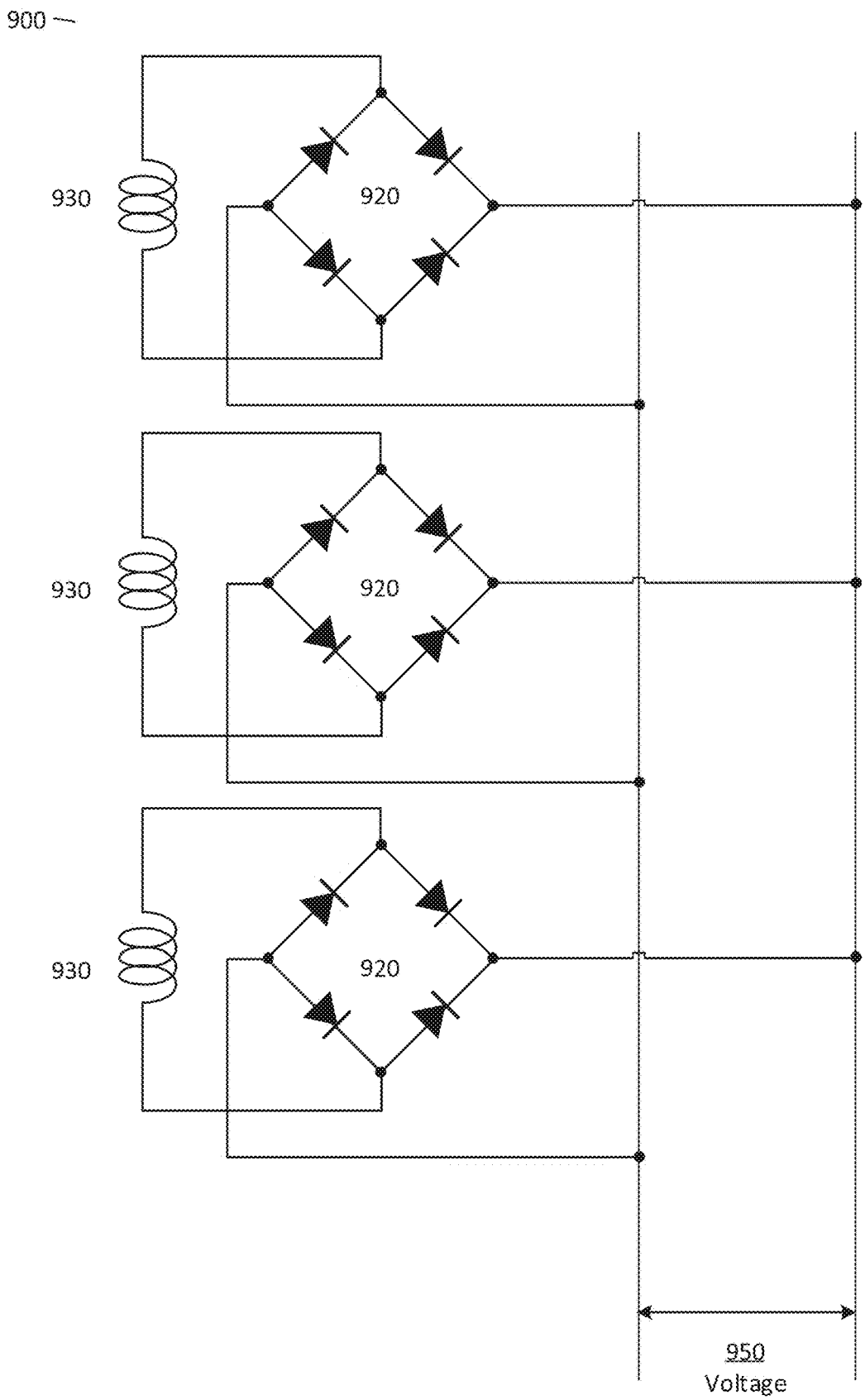
FIG. 9 depicts an illustrative wireless charging circuit containing full bridge rectifiers, according to some embodiments.

FIG. 9 depicts an illustrative wireless charging circuit containing full bridge rectifiers, according to some embodiments. As an alternative to the above-described approaches in which an inductor is arranged in series with a rectifier, wireless charging circuit 900 illustrates inductors 930 each connected with a corresponding full bridge rectifier 920. Irrespective of the orientation of each of the inductors 930, a net DC voltage will be output across the full bridge rectifiers 920, yielding a combined net DC voltage 950.

According to some embodiments, wireless charging circuit 900 may be integrated into a textile and coupled to a battery charging circuit. In some embodiments, wireless charging circuit 900 may be connected (e.g., via a battery or otherwise) to one or more sensing, communications, computation and/or actuation devices. In some embodiments, a wireless charging circuit integrated with a textile may be arranged to include both full bridge rectifiers as shown in FIG. 9 in addition to other rectifiers arranged in serial with inductors as shown in FIGS. 1-5. In some embodiments, inductors and respective full bridge rectifiers may be arranged in a unit cell that is repeated to form an interconnected array of inductors and rectifiers.

Having thus described several aspects of at least one embodiment of this invention, it is to be appreciated that various alterations, modifications, and improvements will readily occur to those skilled in the art.

According to some aspects, a method of wirelessly charging a garment comprising at least one textile and a wireless power receiver integrated into the at least one textile may be provided, the method comprising placing the garment into an enclosure, wherein an interior of the enclosure comprises an AC magnetic field. According to some embodiments, the wireless power receiver comprises a plurality of inductors, and the method further comprises inducing, via the AC magnetic field, an AC current within the plurality of inductors of the wireless power receiver. According to some embodiments, the wireless power receiver comprises a plurality of rectifying elements in series with respective inductors of the plurality of inductors, and the method further comprises producing a DC current from the plurality of rectifying elements. According to some embodiments, the garment comprises a rechargeable battery, and the method further comprises combining the DC current from the plurality of rectifying elements and supplying the combined DC current to the rechargeable battery. According to some embodiments, the enclosure is a portion of a piece of furniture. According to some embodiments, the method further comprises activating the AC magnetic field by closing the enclosure.

The above-described embodiments of the technology described herein can be implemented in any of numerous ways. According to some embodiments, components of smart garments such as actuators, sensors, etc. may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A wirelessly chargeable smart garment, comprising:
   at least one textile; and
   a wireless power receiver integrated into the at least one textile, the wireless power receiver comprising:
      a plurality of inductors;
      a plurality of rectifying elements in series with respective inductors of the plurality of inductors; and
      a power output coupled to the plurality of inductors and the plurality of rectifying elements and configured to produce a net DC power from the plurality of inductors,
   wherein the at least one textile is flexible such that the plurality of inductors are configurable in arbitrary positions and directions with respect to one another.

2. The garment of claim 1, wherein the plurality of rectifying elements include fiber-based diodes integrated into the at least one textile.

3. The garment of claim 1, further comprising a battery electrically coupled to the power output of the wireless power receiver.

4. The garment of claim 3, further comprising one or more electrical components electrically coupled to the battery, wherein the one or more electrical components are configured for electronic sensing, computation, communications and/or actuation.

5. The garment of claim 1, further comprising one or more electrical components configured for electronic sensing, computation, communications and/or actuation.

6. The garment of claim 1, wherein at least some of the plurality of rectifying elements are light emitting diodes (LEDs).

7. The garment of claim 1, wherein the plurality of inductors include conductive fibers woven and/or knitted into the at least one textile.

8. The garment of claim 1, wherein the plurality of inductors include one or more spiral coil inductors.

9. The garment of claim 1, wherein the plurality of inductors and the plurality of rectifying elements include a plurality of interconnected unit cells that each comprise the same arrangement of inductors and rectifying elements.

10. A system for wirelessly charging smart garments, the system comprising:
    an enclosure comprising at least one magnetic field source operable to produce an AC magnetic field within the enclosure; and
    a garment within the enclosure, the garment comprising:

at least one textile; and
a wireless power receiver integrated into the at least one textile, the wireless power receiver comprising:
a plurality of inductors;
a plurality of rectifying elements in series with respective inductors of the plurality of inductors; and
a power output coupled to the plurality of inductors and the plurality of rectifying elements and configured to produce a net DC power from the plurality of inductors,
wherein the at least one textile is flexible such that the plurality of inductors are configurable in arbitrary positions and directions with respect to one another.

11. The system of claim 10, further comprising a piece of furniture, the piece of furniture comprising the enclosure.

12. The system of claim 10, wherein the at least one magnetic field source includes at least one coil.

13. The system of claim 10, wherein the at least one magnetic field source is integrated into walls of the enclosure.

14. The system of claim 10, wherein the garment further comprises a battery electrically coupled to the power output of the wireless power receiver.

15. A wirelessly chargeable smart garment, comprising:
at least one textile; and
a wireless power receiver integrated into the at least one textile, the wireless power receiver comprising a plurality of interconnected unit cells, each unit cell of the plurality of unit cells comprising at least one inductor and at least one rectifying element, the plurality of unit cells being coupled to a power output of the wireless power receiver, the power output being configured to produce a net DC power from the inductors of the plurality of unit cells, and
wherein the at least one textile is flexible such that the inductors of the plurality of unit cells are configurable in arbitrary positions and directions with respect to one another.

16. The garment of claim 15, wherein each unit cell of the plurality of unit cells comprises an inductor in series with a rectifying element.

17. The garment of claim 15, wherein, for each unit cell of the plurality of unit cells, the at least one rectifying element includes a full-bridge rectifier, the full-bridge rectifier being connected to the at least one inductor.

18. The garment of claim 15, further comprising a battery electrically coupled to the power output of the wireless power receiver.

19. The garment of claim 15, further comprising one or more electrical components configured for electronic sensing, computation, communications and/or actuation.

20. The garment of claim 15, wherein the at least one inductor of each unit cell includes conductive fibers woven and/or knitted into the at least one textile.

* * * * *